Sept. 3, 1968      L. H. BRIXNER      3,400,081

RARE EARTH SILICATE PHOSPHOR COMPOSITION

Filed Feb. 1, 1965

INVENTOR
LOTHAR H. BRIXNER

BY    *Fred E. Carlson*

ATTORNEY 3,400,081
RARE EARTH SILICATE PHOSPHOR
COMPOSITION
Lothar H. Brixner, Brandywine Hills, Pa., assignor to E. I.
du Pont de Nemours and Company, Wilmington, Del.,
a corporation of Delaware
Filed Feb. 1, 1965, Ser. No. 429,497
3 Claims. (Cl. 252—301.4)

ABSTRACT OF THE DISCLOSURE

Luminescent materials of generic formula $$AB_{1-x}Eu_xSiO_4$$

where A is lithium, sodium, or potassium; B is yttrium, gadolinium, lanthanum, or lutetium, and $x$ has a value of from 0.05 to 0.4 inclusive are prepared by mixing silicates of each of the component metals and firing for from 10 to 14 hours, first at 800° to 1000° C., then at 1000° C. to 1200° C.

---

This invention relates to new luminescent materials and to methods for producing them, and is more particularly directed to novel compositions of matter which are single-phase solid solutions comprising the constituent components $ABSiO_4$ and $AEuSiO_4$ where A is a monovalent metal of atomic number in the range 3 through 19 inclusive, and B is a trivalent rare earth element selected from the group consisting of yttrium, lanthanum, gadolinium, and lutetium. The invention is further particularly directed to processes for making these compositions by controlling heating of mixtures of the component silicates. More specifically, the novel compositions are single-phase solid solution compounds of the generic formula $AB_{1-x}Eu_xSiO_4$ where A is a monovalent metal selected from the group consisting of lithium, sodium, and potassium, B is a trivalent element selected from the group consisting of yttrium, lanthanum, gadolinium and lutetium; and $x$ has a value of from 0.05 to 0.4. The processes for producing these compositions comprise the steps of (a) intimately mixing stoichiometric quantities of silicates of the selected metals of the generic formula: (b) firing the mixture at a temperature in the range of 800° to 1000° C. for from about 10 to 14 hours; (c) subjecting the fired product to comminution and remixing; and (d) firing the comminuted product at a temperature of 1000° to 1200° C. for about 10 to 14 hours.

Figure 1:
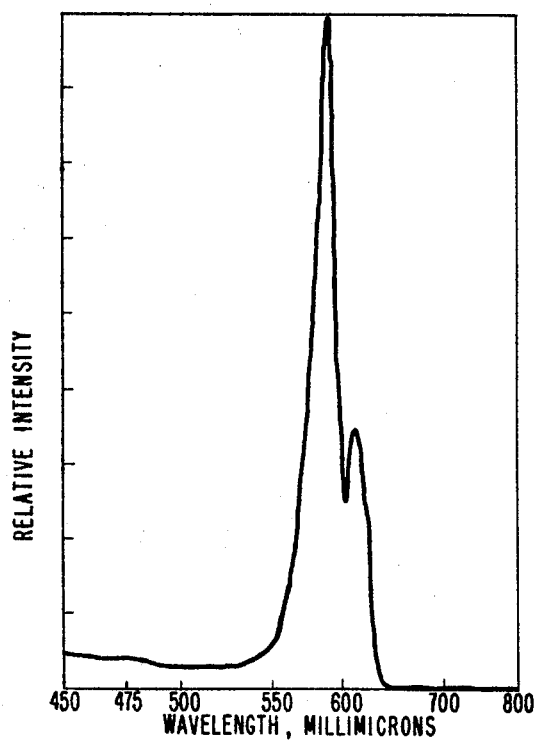

In the drawings:
FIGURE 1 shows the fluorescent spectrum for a composition of the invention viz. $NaGd_{0.70}Su_{0.30}SiO_4$. In this figure the wave length of fluorescent emission is plotted against arbitrary intensity units to show that the most intense emission is at about 5900 A., with a very narrow line half-width thus showing sharp emission in the red. (By "half-width" is meant the line width at half the intensity peak.)

Figure 2:
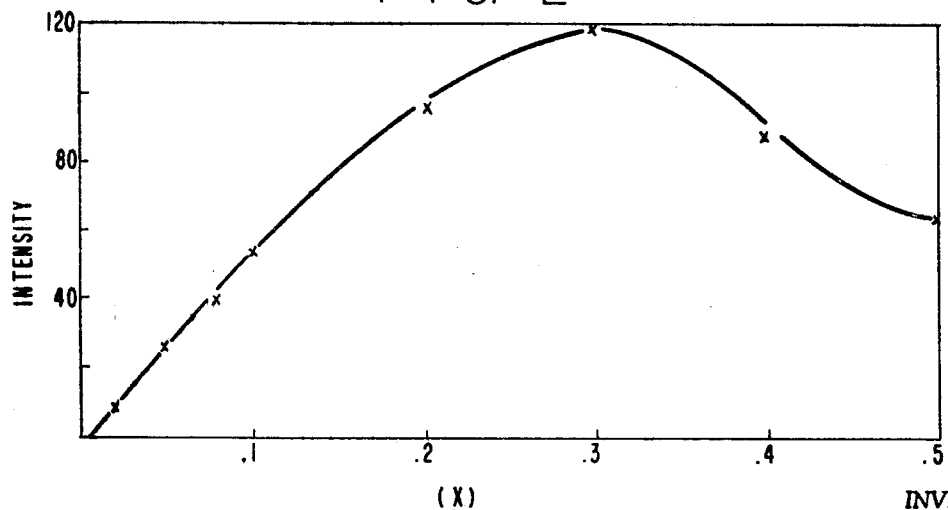

FIGURE 2 shows a graph in which intensity of fluorescent emission (in arbitrary units) is plotted against values of $x$ from 0 to 0.5 for compositions of the generic formula $NaGd_{1-x}Eu_xSiO_4$. From this figure it will be seen that a maximum in intensity of fluorescent emission is obtained when $x$ has a value of about 0.3. Therefore a preferred composition of this invention is one having the formula $NaGd_{0.7}Eu_{0.3}SiO_4$, the precipitation of which is described in Example 7.

If desired, for convenience in handling, the comminuted product of step (c) of the process may be pelletized before the second firing step (d). Although it has been stated in step (a) above that stoichiometric quantities of silicates are mixed and used as reactants to form the products of this invention, it should be understood that other materials such as carbonates and oxides which upon heating are converted to silicates are the full equivalent. The reactions which take place are illustrated by the following general equations:

Double silicates of the desired metal and rare earth elements can be blended and reacted according to:

$$xABSiO_4 + 1-xAEuSiO_4 \rightarrow AB_xEu_{1-x}SiO_4$$

where A is an element of the group Li, Na and K, B is an element of the group Y, La, Gd, and Lu, and $x$ has a value of 0.05 to 0.4 inclusive. It is preferable, however, to use the oxides of the elements which may be obtained in a pure state and to react these oxides with the alkali metal carbonate and silica according to the following equation:

$$A_2CO_3 + xEu_2O_3 + 1-xB_2O_3 + SiO_2$$
$$\rightarrow 2AB_{1-x}Eu_xSiO_4 + CO_2$$

The compositions of this invention are useful as red phosphors and are particularly useful as red phosphors for color television screens. They are especially advantageous because of their extremely high efficiency and ready electron excitation. Because of their greater brightness as well as better color fidelity, the compositions of this invention have been found to be superior to the currently used phosphors such as, for example, silver-activated zinc-cadmium sulfides, and also in comparison to what is probably considered currently the best red phosphor for television screens, $Gd_{0.9}Eu_{0.06}VO_4$.

It is, therefore, an object of this invention to produce luminescent compositions of matter which will be useful for their light-emitting abilities. A further object is to prepare luminescent materials which because of their ability to emit light of good intensity over a very narrow spectral range are classed as line-emitters. It is a further object of this invention to prepare luminescent materials which emit strongly in the red upon exposure to ultra-violet excitation. A still further object is to produce for use in television screens, fluorescent materials of greater brightness and better color fidelity than is exhibited by prior known television phosphors. These objects are accomplished by the herein-described novel processes and compositions.

In processes of this invention, the component oxides were weighed to the nearest 0.1 milligram according to the stoichiometry desired in the final product. The oxides were thoroughly mixed and fired in air at a temperature in the range of 800° to 1000° C. for about 10 to 14 hours. The product of this heating was broken up, ground in an agate ball-mill under acetone, dried and, in some instances, pressed into pellets of about one inch diameter under 10,000 to 20,000 p.s.i. In a second firing step, the comminuted powder or the pellets were fired at about 10000 to 1200° C. for from 10 to 14 hours. The products of this second firing, white homogeneous crystalline materials, were examined by X-ray diffraction analyses and were found to be single-phase solid solutions having none of the original components present.

The rare earth oxides used in the preparations of this invention were of the highest purity (>99.9%) available and were obtained from Linde Chemical Division of American Potash and Chemical Company. The other chemicals used were of reagent grade quality and were obtained from Baker and Adams Chemical Company.

The following examples illustrate in detail the preparation of the novel fluorescent compositions.

Example 1

This example concerns the preparation of a phosphor of chemical composition $NaGd_{0.99}Eu_{0.01}SiO_4$. For the making of this product the following weights of materials were used:

| Material: | Grams |
|---|---|
| $Eu_2O_3$ | 0.0332 |
| $Gd_2O_3$ | 3.3793 |
| $Na_2CO_3$ | 1.0000 |
| $SiO_2$ | 1.1338 |

The amounts of reactants used were stoichiometric for the preparation of $NaGd_{0.99}Eu_{0.01}SiO_4$ according to the following equation:

$$Na_2CO+0.01Eu_2O_3+0.99Gd_2O_3+2SiO_2 \rightarrow 2NaGd_{0.99}Eu_{0.01}SiO_4+CO_2$$

These materials were blended, then ground together under acetone in an agate ball-mill, using agate balls. The mixture was dried and fired at 900° C. for 14 hours. The product of this firing was cooled, broken up and reground in acetone in the agate mill, then again dried. The powder product was then compressed into pellets about one inch in diameter and refired at 1100° C. for 14 hours.

At the conclusion of this firing step, the product was found by X-ray diffraction analysis to be single-phase solid solution with none of the original components detectable. The fluorescent emission of the product was studied and is included as a part of the data given in FIGURE 2.

Examples 2–9

By the method of Example 1, additional compositions of the generic formula $NaGa_{1-x}En_xSiO_4$ were prepared using stoichiometric quantities or reactants as listed in Table 1.

TABLE 1

| Example No. | Value for x | Weights of Reactants | | | |
|---|---|---|---|---|---|
| | | $Eu_2O_3$ | $Gd_2O_3$ | $Na_2CO_3$ | $SiO_2$ |
| 2 | 0.02 | 0.0664 | 3.3452 | 1.0000 | 1.1338 |
| 3 | 0.05 | 0.1660 | 3.2428 | 1.0000 | 1.1338 |
| 4 | 0.08 | 0.2657 | 3.1404 | 1.0000 | 1.1338 |
| 5 | 0.1 | 0.3321 | 3.0721 | 1.0000 | 1.1338 |
| 6 | 0.2 | 0.6642 | 2.7307 | 1.0000 | 1.1338 |
| 7 | 0.3 | 0 9963 | 2.3894 | 1.0000 | 1.1338 |
| 8 | 0.4 | 1.3284 | 2.0481 | 1.0000 | 1.1338 |
| 9 | 0.5 | 1.6605 | 1.7067 | 1.0000 | 1.1338 |

Each of these products was analyzed by X-ray diffraction analysis and was found to contain none of the original reactants as such.

The fluorescent emission of each of these compositions was tested and is incorporated in the data shown in FIGURE 2.

A comparison was made between the results in fluorescence obtained by excitation of the product of Example 7 and of a commercially available phosphor, $Gd_{0.94}Eu_{0.06}VO_4$, probably the best presently known red television phosphor. Under electro excitation with a beam of 100 μA. accelerated by 10 kv. (conditions closely resembling those in a color television tube), the bright red signal for the product of Example 7 was 167 mv. while that for the commercial vanadate was 110 mv.

In the preparation of the luminescent compositions of this invention it has been found that, although sodium is preferred as the alkali metal constituent, lithium or potassium may be substituted for sodium without significant effect on the luminescent properties of the product. The rare earth element which is used in x amount in conjunction with a 1—x quantity of europium in the compositions of this invention is chosen from the group consisting of yttrium, lanthanum, gadolinium, and lutetium. These rare earth elements are useful as host elements, a portion of which is substituted by europium, because they possess in common the following two characteristics: (1) they have no intrinsic color, and therefore offer no interference with the clean red emission of the product phosphor, and (2) they themseleves do not emit in the visible spectrum upon ultraviolet excitation, and, therefore, again offer no interference with the red emission of the product phosphor.

I claim:

1. In a process for the production of red luminescent compositions of the generic formula $AB_{1-x}Eu_xSiO_4$ where A is a monovalent metal having an atomic number in the range of 3 through 19 inclusive, and B is an element selected from the group consisting of yttrium, lanthanum, gadolinium, and lutetium, and x has a value of from 0.05 to 0.4 inclusive, the steps comprising (a) intimately mixing in stoichiometric amounts, silicates of each of the metals of the generic formula; (b) firing the mixture at a temperature of from 800° to 1000° C. for a period of from 10 to 14 hours; (c) subjecting the fired product to comminution and remixing; and (d) firing said comminuted material at a temperature of 1000 to 1200° C. for from 10 to 14 hours.

2. A single-phase solid-solution, red luminescent composition of formula $AB_{1-x}Eu_xSiO_4$ where A is a monovalent metal of atomic number in the range of 3 through 19 inclusive, and B is an element selected from the group consisting of yttrium, lanthanum, gadolinium, and lutetium; and x has a value of 0.05 to 0.4 inclusive.

3. A single-phase, solid-solution, red luminescent composition of claim 2 in which A is sodium, B is gadolinium and x has a value of 0.3.

References Cited

UNITED STATES PATENTS

| 3,177,154 | 4/1965 | Soden et al. | 252—301.5 |
| 3,177,156 | 4/1965 | Soden et al. | 252—301.5 |
| 3,250,722 | 5/1966 | Borchardt | 252—301.4 |

TOBIAS E. LEVOW, *Primary Examiner.*

ROBERT D. EDMONDS, *Assistant Examiner.*